June 12, 1951     J. L. McKIBBEN     2,556,768
NEUTRON DETECTOR
Filed Oct. 16, 1945     2 Sheets-Sheet 1

Inventor:
Joseph L. McKibben
By
Attorney

June 12, 1951  J. L. McKIBBEN  2,556,768
NEUTRON DETECTOR
Filed Oct. 16, 1945  2 Sheets-Sheet 2

Witnesses:
Herbert E. Metcalf
Paul J. Glaister

Inventor:
Joseph L. McKibben
By Robert A. Lavender
Attorney.

Patented June 12, 1951

2,556,768

UNITED STATES PATENT OFFICE 2,556,768

NEUTRON DETECTOR

Joseph L. McKibben, Madison, Wis., assignor to the United States of America as represented by the United States Atomic Energy Commission Application October 16, 1945, Serial No. 622,634

15 Claims. (Cl. 250—83.6)

The present invention relates to an improved neutron detector.

In connection with various physical investigations and procedures which involve the use of neutrons, it is necessary to employ some type of neutron detection means in order to determine and measure the neutron density. The neutron detection means heretofore available in the art operate reasonably satisfactorily when the neutrons to be measured are of substantially equal energies, and in instances when the neutron energies do not vary over a very wide range. However, neutron sources rarely emit neutrons of equal energies. The neutron beam from a neutronic reactor, for example, may include neutrons whose energies vary from thermal energy to energies of several million times that amount, and in order that such a beam may be used effectively, the neutron detecting means must be capable of yielding substantially straight line response to neutrons of the varying energy present in such beam. The apparatus heretofore available has been incapable of doing this. When the apparatus was capable of detecting thermal neutrons, it was not sufficiently sensitive to satisfactorily detect high energy neutrons, and vice versa, and this deficiency seriously handicapped research in the field.

The present invention has for a principal object the provision of a neutron detection and measuring means having a response characteristic which is substantially independent of the neutron energy or neutron intensity. In other words, it is an object of the invention to provide a neutron detection and measuring means which has a substantially uniform sensitivity to neutrons so that a substantially flat response is obtained to neutrons between energies of a few kilovolts and a few million volts. This object is accomplished by combining a neutron responsive unit which is inherently responsive only to neutrons of a particular limited energy range, with a neutron reflector or shield structure which is effective to extend very greatly the response range of the neutron responsive unit. The design of the constituent parts of the combination is carefully correlated in a novel manner, as will be made apparent in the accompanying drawings and the following description.

In the drawings:

Fig. 2 is a sectional view on the line 2—2 of Fig. 1;

Each of the particular neutron detection means illustrated in the several figures of the drawings includes an elongated neutron responsive unit which is responsive to thermal energy neutrons only, and a reflector-shield or sleeve structure of neutron slowing material which is disposed peripherally about such unit and which is of such design that it effectively reduces the energy of all neutrons entering the device to thermal, i. e., detectable, energies. In use the devices are aimed in the direction of the source of the neutrons to be detected with the longitudinal axis of device pointing toward the neutron source. Conveniently, the neutron responsive unit comprises an ionization chamber, which, except for the fact that it has an axial length many times its width, may follow conventional designs of such chambers. The particular chamber illustrated at 11 in Figures 1 through 7 of the drawings comprises a cylindrical tube 13 of brass, or other metal, which serves as the outer electrode of the device, and which is provided with suitable insulating electrode supports 15 at either end thereof. These serve to support the inner or collecting electrode 17, which may conveniently comprise a small diameter wire or rod, as illustrated. The inner surface of the tube 13 may be coated with a material which is neutron responsive such as boron, or the 235 isotope of uranium, U235, or other material having a large fission or absorption cross-section to thermal neutrons, and which by neutron capture produces instantaneously an ionizing event in order that the device shall be neutron responsive. When a coating of this character is used, the ion chamber 11 should be filled with a readily ionizable gas, such as argon, which may be at atmospheric pressure, and the chamber should, of course, be sealed. As an alternative construction, the inner coating may be omitted, and the tube may be filled with a gas, such as boron trifluoride, $BF_3$, which is neutron responsive. Electrical connections are provided, as illustrated at 19 and 21, in order that the outer and inner electrodes may be connected to a suitable source of potential as is well known in the art.

Figures 6, 7:
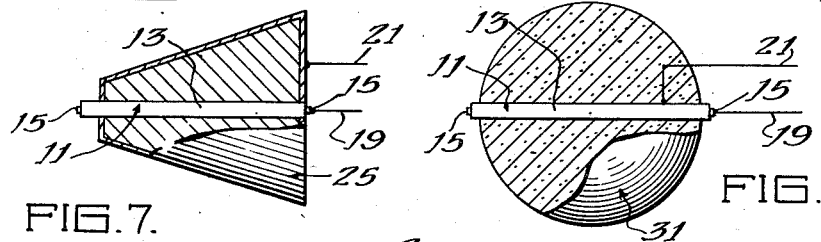
Figs. 6 and 7 are sectional views, also similar to Fig. 1, illustrating two other possible forms of the invention.
Figures 1, 5:
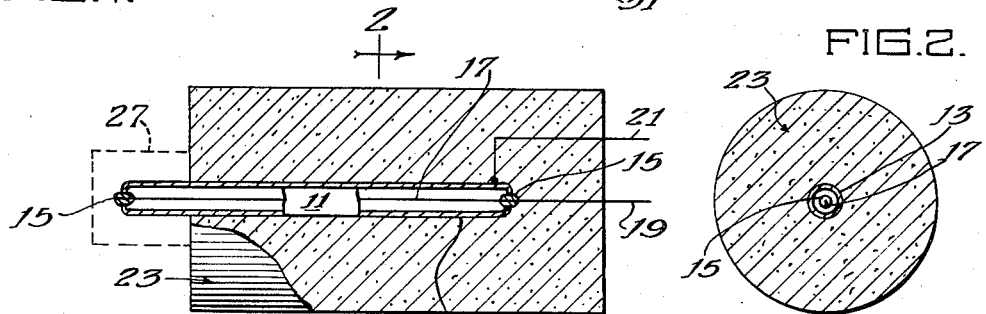
Fig. 1 is a longitudinal sectional view through a neutron detection means constructed in accordance with the invention.
Fig. 5 is an end elevation of the device shown in Fig. 4.
Figure 4:
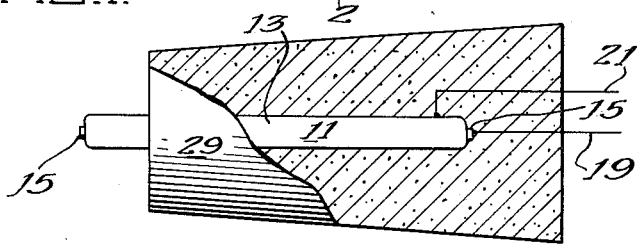
Fig. 4 is a sectional view, similar to Fig. 1, of a modified form of the apparatus.

The reflector or shield of neutron slowing material, which constitutes the other principal element of the combination, comprises, in the embodiment illustrated in Fig. 1, a hollow, cylindrical, sleeve member 23 which peripherally surrounds the chamber 11 except at one end thereof, which end is left exposed as shown. The sleeve or shield 23 is positioned coaxially with the chamber 11, and it should be constructed of a neutron slowing material having a low neutron absorption cross-section. The most uniform response characteristics appear to be obtained by the use of a hydrogenous slowing material, such as paraffin, and this material is particularly recommended. However, other neutron slowing materials, such as graphitic carbon, beryllium, water and heavy water, may be employed with good results. A shield construction, utilizing heavy water as the neutron slowing material, is shown in Fig. 7. This construction has the disadvantages that a tank must be provided for the heavy water, as illustrated at 25, and that precautions must be taken to obviate any loss of this relatively expensive material.

The extent to which the neutron responsive ionization chamber 11 projects from the shield 23 is not particularly critical. In some instances, it appears advisable that a length of the chamber about equal to the width or diameter thereof should extend beyond the main body of the shield, but good results are obtained with a somewhat greater length of the chamber extending. It is also possible, and in some instances desirable, to operate the device with nothing more than the end of the ionization chamber exposed. Also, it is possible to obtain improved detection characteristics under certain other instances by covering the exposed portion of the chamber 11, with a relatively thin shield of neutron slowing material, such as is indicated by the dotted outline 27 in Fig. 1. For most conditions, this additional end shield should not be of greater thickness than the width or diameter of the chamber 11, and it is accurate to say that this end of the chamber should be substantially free of neutron slowing material, as compared with the shielded portion of the chamber.

Figure 8:
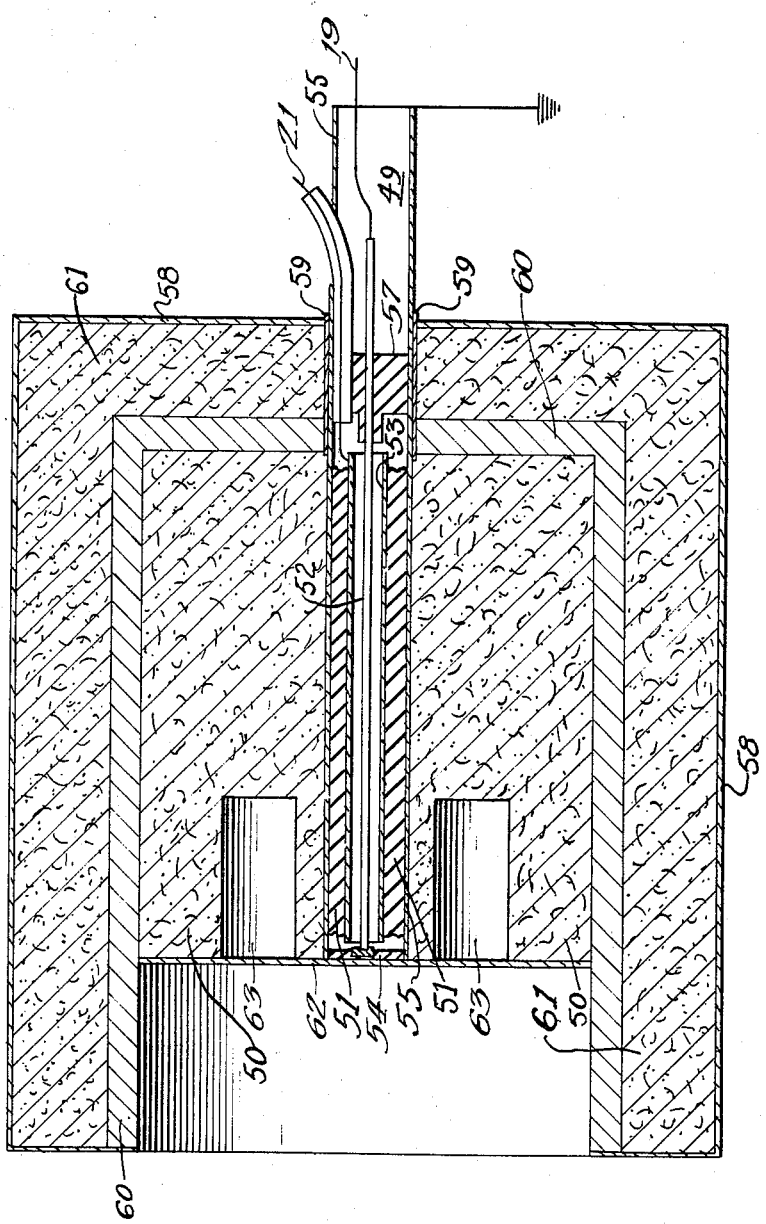
Fig. 8 is a longitudinal, central sectional view of a further modified form of the invention.

The particular shape of the shield of neutron slowing material is not especially critical. For example, the shield may take the form of a frustrum of a hollow cone as illustrated at 29 in Fig. 4 and in Fig. 7, or it may be spherical as illustrated at 31 in Fig. 6. The cylindrical form illustrated in Figs. 1, 2 and 8 is the simplest to construct and is in general, the most satisfactory form. The thickness and especially the length of the shield or sleeve of neutron slowing material are, however, most important.

In order that the device shall operate with maximum efficiency, the neutron slowing shield should be of sufficient length that substantially all neutrons of the highest energies which the device may be required to detect shall be slowed to detectable energies before such neutrons pass entirely through the device. Stated somewhat differently, the length of the shield should be such that the probability of a fast neutron passing entirely through the device without being slowed to detectable energy is very small. For the particular detecting means contemplated in the illustrated structures, this requires that the length of the neutron slowing and reflecting shield shall be sufficient to reduce the energy of substantially all neutrons entering the device to thermal energy. The thickness of the shield should be sufficient to minimize leakage of neutrons during the neutron slowing operation to a very low value. Considering a specific example, in a device utilizing a hollow cylindrical, paraffin shield disposed about and in contact with an elongated, thermal neutron responsive, cylindrically shaped, ionization chamber of ordinary dimensions (i. e., a chamber having a diameter of the order of about one half to one inch), it has been found that a shield having a length of the order of about 8 inches and a wall thickness of the order of from about 3 to 4 inches will effect thermalization of neutrons having energy levels from a few kilovolts up to about 2 to 3 million electron volts, with only very small probability of the higher energy level neutrons passing through the shield and out of the device before reaching detectable thermal energies, and with very low leakage. The dimensions for shields of other suitable neutron slowing materials can be readily determined on the basis of the comparative neutron slowing ability of such other materials.

The modification of the invention illustrated in Fig. 8 includes additional structural features adapted to improve the directional quality of the device, by minimizing the effect of neutrons approaching from a direction other than along the longitudinal axis of the device, and to improve the fundamental accuracy of the device by providing means for preventing particle radiation other than neutron radiation from activiating the device. The Fig. 8 apparatus includes a neutron responsive detection unit, specifically an ionization chamber 49 disposed within a hollow cylindrical, sleeve-like neutron reflector or shield 50 of suitable neutron slowing material, similar to the reflecting shields of the previously described embodiments. In addition, the device includes a cup-shaped shield 60 of neutron absorbing material such as boron carbide, B$_4$C, which surrounds the ionization chamber 49 and the shield 50, as illustrated. The cup-shaped neutron absorbing shield 60 improves the directional quality of the device by effecting absorption of such neutrons as may approach the device from a direction other than along the longitudinal axis thereof.

The neutron absorbing efficiency of the shield 60 can be increased substantially by the provision of an outer enclosing layer of neutron slowing material. In the illustrated structure, the shield 60 is disposed within a hollow cylindrical, cup-shaped body of paraffin 61 which provides a layer of neutron slowing material about 1½ to 2 inches thick about the neutron absorbing shield 60. Desirably the entire shield structure comprising the inner, neutron slowing and reflecting shield 50, the neutron absorbing shield 60, and the outer shield 61, are enclosed within a supporting shell or casing 58 of sheet steel or other conducting material.

The casing 58 is open at the forward end of the apparatus and is provided with an inwardly extending metallic sleeve 59 integrally attached thereto which serves to slidably support the ionization chamber unit 49 for movement into and out of the shield structure. For safety reasons, the casing 58 is desirably maintained at ground potential.

The ionization chamber 49 includes a cylindrical outer sleeve 55, and a hollow cylindrical insulator 51 which is disposed concentrically within, and which tightly engages the outer sleeve 55. The insulator 51 serves as a spacer and a support for a cylindrical shell or film 53 of the 235 isotope of uranium, U235, or other neutron responsive material capable of effecting an ionizing event when subjected to neutron irradiation. The shell 53 is utilized as the high voltage electrode of the chamber, and electrical connection thereto is provided by the insulated lead-in 21, as illustrated. The inner electrode for the ionization chamber is provided by a rod 52 of conducting material which extends coaxially of the shell 53, and is held in spaced relation thereto by means of suitable insulating supports 54 and 57 which have the further function of sealing the ends of the chamber casing 55. During use, the ionization chamber may contain a readily ionizable gas such as argon, as in the previously described structures. Electrical connection to the central electrode 52 is provided by a suitable connection 19. It is, of course, possible to utilize an ionization chamber having ordinary conducting electrodes and containing a neutron responsive gas such as boron trifluoride, BF₃, in place of a device such as is described above.

The relative dimension of the several parts should be such that the ionization chamber 49 can be readily pushed into place within the shield structure while at the same time the inner reflecting shield 50 should snugly engage the outer casing 55 of the ionization chamber.

It is contemplated that a device of this character may be employed for the detection and measurement of neutron radiation resulting from nuclear reactions which are induced by slow or thermal energy neutrons. In such instances, in order to secure accurate measurements of the reaction process, it is necessary to prevent the thermal neutrons which induce the reaction, from activating the detection and measuring apparatus. To accomplish this desired selective measurement, the apparatus illustrated in Fig. 3 includes a shield disposed over the end of the ionization chamber 49 and over the end of the neutron slowing and reflecting shield 50 which is disposed about that chamber. This shield may conveniently comprise a thin circular plate 62 of cadmium, positioned as illustrated. The shield plate 62 will act to filter out the reaction producing slow or thermal energy neutrons incident thereon, and this will limit the response of the detection and measuring means to the neutrons resulting from the nuclear reaction.

Symmetrically spaced, open-ended, cylindrically shaped cavities 63 of about the same diameter as the ionization chamber 49 are provided in the end of the neutron slowing and reflecting shield 50 which faces the source of the neutrons being detected or measured by the apparatus. The cavities 63 extend into the shield 50 from behind the cadmium shield plate 62 for gamma radiation to a substantial depth, as indicated in the drawing. The cavities 63 serve to broaden the range of response of the device to neutrons of various energies.

If desired, other neutron responsive detection means may be used instead of an ionization chamber. For example, a cylinder or other member of gold, silver or other material which becomes radioactive when subjected to neutron irradiation may be inserted in lieu of the ionization chamber 49. This member may later be removed and the induced radioactivity measured by conventional methods.

Figure 3:
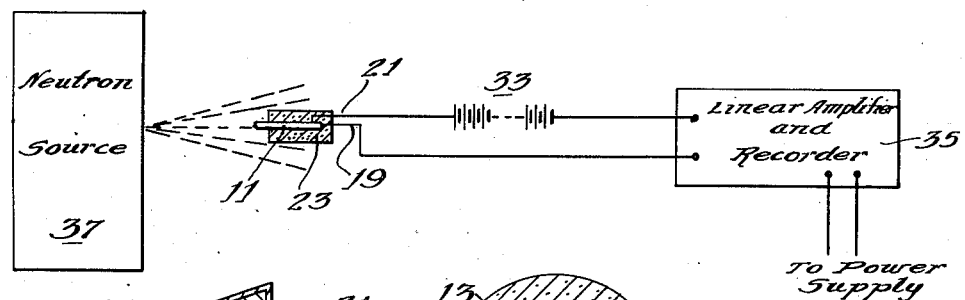
Fig. 3 is a diagrammatic view illustrating the device of Fig. 1 in use.

In use the neutron detector apparatus of the invention is connected to a suitable source of high potential to establish the necessary potential gradient between the ionization chamber electrodes, and it is desirably connected to a linear amplifier and recorder in order that the neutron induced ionizations may be counted and a record thereof obtained. A circuit of this character is shown in Fig. 3, wherein there is illustrated a neutron detection device similar to that of Figs. 1 and 2, a potential source 33, a linear amplifier and recorder 35, and a neutron source 37. The amplifier and recorder 35 may be of any conventional design. In use, the detector is pointed axially at the source of neutrons with the end which is unshielded, or substantially free of neutron slowing material, nearest the source. The neutrons emerging from the source 37, as indicated by the dotted lines in Figure 3, may include thermal energy and high energy neutrons. These enter the exposed end of the neutron responsive chamber and the end of the shield. The thermal energy neutrons will be detected immediately by the ionization events produced in the neutron responsive chamber. The low energy, or slow neutrons, after moving a relatively short distance through the neutron slowing material of the shield, will be slowed to thermal energies and detected, and the higher energy neutrons will move progressively farther into the shield mass before reaching detectable energizes. In effect, the device operates by slowing down substantially all of the neutrons to thermal energy level. When apparatus of the type illustrated in Fig. 3 is employed, the operation is exactly the same except that the additional radiation screen 62, disposed in front of the input end of the detection means 49, and the neutron slowing shield 50 serve to intercept the unwanted radiation and to prevent that radiation from affecting the response of the apparatus.

The neutron detector of the invention has substantially straight line response characteristics for neutrons having extremely wide ranges of neutron energies, and, in operation, it has proven a most useful device. The features of the invention, which are believed to be new, are expressly pointed out in the accompanying claims.

What is claimed is:

1. In apparatus of the class described, neutron detection means which is inherently capable of detecting neutrons of a particular limited energy range, and means for increasing the operable range of said detection means, comprising a body of neutron slowing material disposed about said neutron detection means and having an opening transmitting neutrons possessing a detectable energy to the neutron detection means.

2. In apparatus of the class described, neutron detection means which is inherently capable of detecting neutrons of thermal energy only, and a sleeve-like shield of neutron slowing material disposed about said detection means and having an opening to transmit thermal neutrons to the detection means, the dimensions of said shield being such that said shield is effective to slow neutrons of the highest energy level which it is desired to detect to thermal energy level, and the dimensions of said detection means being so correlated relative to the dimensions of said shield that efficient detection of neutrons slowed to thermal level by said shield will be accomplished.

3. In apparatus of the class described, neutron detection means which comprises an elongated chamber and which is inherently capable of detecting neutrons of a particular limited energy range, and means for extending the operable range of said detection means comprising a sleeve-like body of neutron slowing material disposed about said elongated detection means and having an opening that is transparent to neutrons possessing detectable energies.

4. In apparatus of the class described, neutron detection means which comprises an elongated chamber and which is inherently capable of detecting neutrons of thermal energy level only, and a sleeve-like shield of neutron slowing material disposed about said detection means, said shield having an opening that is transparent to neutrons of thermal energy, the dimensions of said shield being such that said shield is effective to slow neutrons of the highest energy level which it is desired to detect to thermal energy level, and the dimensions of said detection means being so correlated relative to the dimensions of said shield that efficient detection of neutrons slowed to thermal energy level by said shield will be accomplished.

5. In apparatus of the class described, neutron detection means which comprises an elongated ionization chamber and which is inherently capable of detecting neutrons of thermal energy only, and means for extending the operable range of said detection means comprising a sleeve-like body of neutron slowing material disposed about said ionization chamber, said body having an opening that is transparent to neutrons of thermal energy, the dimensions of said body of neutron slowing material being such that the probability of a neutron of the highest energy level which it is desired to detect passing therethrough without being slowed to thermal level is extremely small.

6. In apparatus of the class described, neutron detection means which comprises an elongated chamber which has a length at least several times its width and which is inherently capable of detecting neutrons of a particular limited energy range, and means for extending the operable range of said detection means comprising a sleeve-like shield body of neutron slowing material which peripherally surrounds said chamber except at one end thereof.

7. In apparatus of the class described, neutron detection means which comprises an elongated chamber, having a length at least several times its cross-sectional width, and which is inherently capable of detecting neutrons of thermal energy only, and means for extending the operable range of said detection means, comprising a sleeve-like shield body of hydrogenous material with peripherally surrounds said chamber except at one end thereof.

8. In apparatus of the class described, neutron detection means which comprises an elongated chamber and which is inherently capable of detecting neutrons of thermal energy only, and a sleeve-like shield body of paraffin disposed about said detection means, said body having an opening that is transparent to thermal neutrons, said shield body being effective to slow neutrons of the highest energy level which it is desired to detect to thermal energy level, and the dimensions of said detection means being so correlated relative to the dimensions of said shield that efficient detection of neutrons slowed to thermal energy level by said shield body will be accomplished.

9. In apparatus of the class described, neutron detection means which comprises an elongated chamber and which is inherently capable of detecting neutrons of a particular limited energy range, and a sleeve-like shield body of neutron slowing material which peripherally surrounds said chamber, at least one end of said chamber being substantially free of neutron slowing material, and said shield body being provided with a plurality of cavities at the end thereof which is adjacent the end of said chamber which is free of neutron slowing material.

10. In apparatus of the class described, neutron detection means which comprises an elongated chamber and which is inherently capable of detecting neutrons of thermal energy level only, and a sleeve-like shield body of paraffin disposed about said elongated chamber, at least one end of said chamber being substantially free of neutron slowing material, and said shield body being provided with a plurality of cavities at the end thereof which is adjacent the end of said chamber which is free of neutron slowing material.

11. In apparatus of the class described, neutron detection means which is inherently capable of detecting neutrons of a particular limited energy range, means for extending the operable range of said detection mean comprising a body of neutron slowing material disposed about said neutron detection means, and a generally cup-shaped shield of neutron absorbing material disposed about said detection means and said body of neutron slowing material for absorbing neutrons which approach said detection means from a direction other than toward the open end of said neutron absorbing shield and the body of neutron slowing material having an opening facing the open end of the shield that is transparent to neutrons of measurable energy.

12. In apparatus of the class described, neutron detection means which comprises an elongated chamber and which is inherently capable of detecting neutrons of thermal energy only, means for extending the operable range of said detection means, comprising a sleeve-like body of neutron slowing material which peripherally surrounds said chamber, except at one end thereof, which end is substantially free of neutron slowing material, and a cup-shaped shield of neutron absorbing material disposed about said chamber and said body of neutron slowing material for absorbing neutrons which approach said chamber from a direction other than toward the end thereof which is free of neutron slowing material.

13. In apparatus of the class described, neutron detection means which comprises an elongated chamber and which is inherently capable of detecting neutrons of a particular limited energy range, means for extending the operable range of said detection means, comprising a sleeve-like body of neutron slowing material which peripherally surrounds said chamber, and a generally cup-shaped shield of neutron absorbing material disposed about said chamber and said body of neutron slowing material for absorbing neutrons which approach said detection means from a direction other than toward the open end of said neutron absorbing shield, at least one end of said chamber being substantially free of neutron slowing material, and said body of neutron slowing material being provided with a plurality of inwardly extending cavities at the end thereof which is adjacent to the open end of said cup-shaped shield.

14. The method of detecting neutrons of various energies by the use of a neutron detection means which is responsive only to neutrons of a particular limited energy level which comprises adjusting the energy of substantially all of the neutrons to be detected to said responsive level, by transmitting the neutrons to the detection means by a plurality of paths, each path containing a means to adjust the energy of the neutrons transmitted therethrough, and each path adjusting the energy of the neutrons passing therethrough by a different amount than the other paths.

15. The method of detecting neutrons of varying energies by the use of a neutron detection means which is responsive only to neutrons of thermal energy which comprises reducing to thermal level the energy of substantially all of the neutrons to be detected by transmitting the neutrons to the detection means through slowing material providing a plurality of paths of varying lengths to the detection means, whereby only the neutrons having thermal energy are detected through the shortest path and neutrons of greater energies are detected through the longer paths.

JOSEPH L. McKIBBEN.

REFERENCES CITED

The following references are of record in the file of this patent:

UNITED STATES PATENTS

| Number | Name | Date |
|---|---|---|
| 2,206,634 | Fermi et al. | July 2, 1940 |
| 2,345,119 | Hare | Mar. 28, 1944 |
| 2,408,230 | Shoupp | Sept. 24, 1946 |

FOREIGN PATENTS

| Number | Country | Date |
|---|---|---|
| 465,045 | Great Britain | Apr. 26, 1937 |